Aug. 13, 1946.
H. E. GRETHER
2,405,824
FERTILIZER DISTRIBUTOR
Filed May 20, 1944
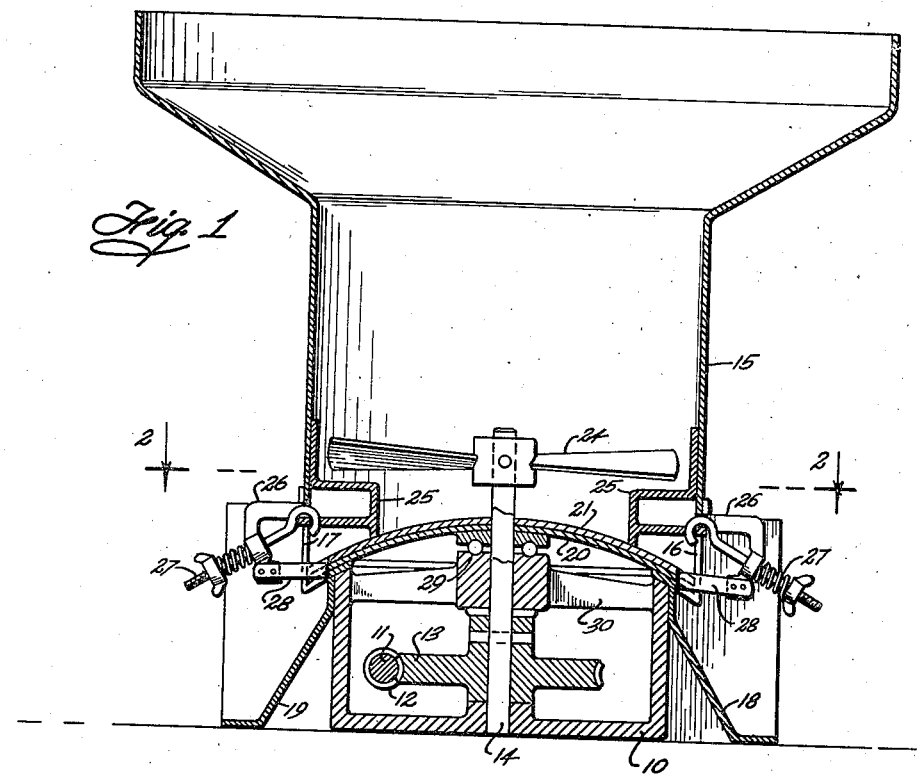
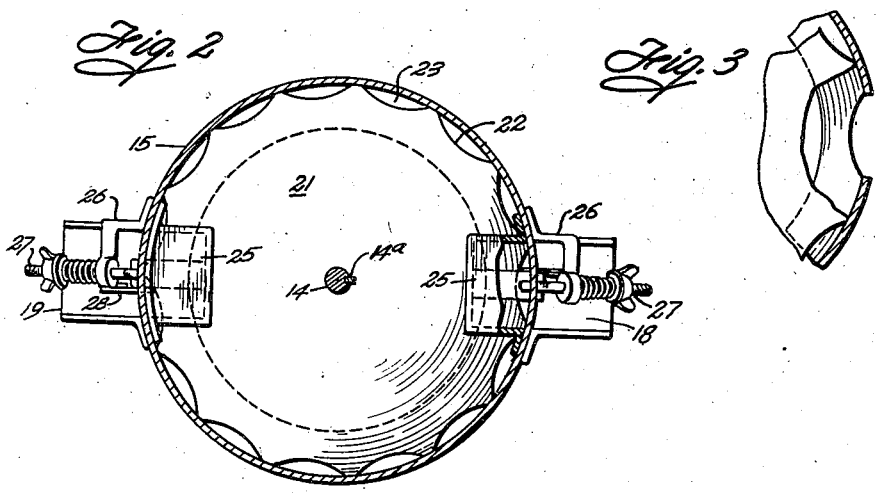
INVENTOR.
HERMAN E. GRETHER
BY
ATTORNEYS Patented Aug. 13, 1946

2,405,824

UNITED STATES PATENT OFFICE 2,405,824

FERTILIZER DISTRIBUTOR

Hermann E. Grether, Camarillo, Calif.

Application May 20, 1944, Serial No. 536,557

4 Claims. (Cl. 222—239)

This invention relates to a fertilizer distributor.

An object of the invention is to provide a construction comprising a hopper in which fertilizer to be distributed may be placed and provide means for evenly and regularly distributing and feeding the fertilizer from the hopper.

Many commercial fertilizers are hygroscopic and because of this are apt to become moist and cake or lump badly during storage so that at the time of use it is difficult to secure an even distribution of the fertilizer. The present invention contemplates a construction wherein the fertilizer even though it may have caked and become quite lumpy, is nevertheless automatically reduced to a finely comminuted state and is evenly and regularly distributed from the hopper through suitable outlets.

Another object of the invention is to provide a fertilizer distributor that may be easily and economically constructed and which may be installed upon a tractor or other vehicle and be power driven thereby.

Still another object of the invention is to provide a fertilizer distributor having relatively few moving parts and which is readily adjustable so that the quantity or the rate at which the fertilizer is fed from the hopper may be intentionally varied at will in accordance with the desires of the operator.

With the foregoing and other objects in view which will be made manifest in the following detailed description and specifically pointed out in the appended claims, reference is had to the accompanying drawing for an illustrative embodiment of the invention, wherein Fig. 1 is a vertical diametrical section through the fertilizer distributor embodying the present invention;

Fig. 2 is a horizontal section taken substantially upon the line 2—2 upon Fig. 1 in the direction indicated;

Fig. 3 is a partial horizontal section illustrating a detail of construction.

Referring to the accompanying drawing wherein similar reference characters designate similar parts throughout, the improved fertilizer distributor comprises a suitable frame or housing 10 which may be mounted on a tractor or any suitable vehicle adapted to traverse the ground to be fertilized. A shaft 11 extends into the housing which is rotated by any suitable source of power such as a takeoff from the tractor wheel. On this shaft there is a worm 12 meshing with the worm wheel 13 that is keyed or otherwise secured to a vertical shaft 14 extending vertically within the housing 10. This construction provides a suitable means for rotating shaft 14. Any other type of drive between a power takeoff of any character and the shaft 14 may be used to cause the shaft 14 to rotate at a relatively slow speed but in direct relation to the distance of the ground traversed.

On top of the housing 10 there is supported a suitable hopper 15 in which the fertilizer to be distributed may be placed. This hopper preferably has an inwardly extending flange at its bottom closing the bottom of the pockets hereafter to be described while these pockets are between the outlets from the hopper. This hopper has outlets 16 and 17 preferably arranged at diametrically opposite sides thereof. These outlets discharge into channels or spouts 18 and 19 and discharge the fertilizer on to the ground to be fertilized. Preferably these spouts are spaced from each other a distance bearing a direct relationship to the distance of the rows of vegetation that it is desired to fertilize.

On the shaft 14 there are mounted one or more plates, two of which are indicated at 20 and 21. These plates are removably mounted on the shaft 14 and are preferably keyed thereto such as by a key 14a. If desired the upper end of the shaft 14 may be squared and the plates may have square holes therethrough to hold the plates against rotation relatively to the shaft and cause the plates to be rotated by the shaft. These plates have aligned peripheral recesses 22 which cooperate with the cylindrical walls of the hopper 15 to form a series of pockets 23 each of which are designed to receive and be filled with fertilizer from the hopper. An impeller 24 is mounted on the upper end of the shaft so as to rotate therewith. This impeller serves to steer the fertilizer in the hopper and to break up cakes or lumps thereof and to urge the fertilizer downwardly toward the pockets. On the inside of the hopper over the outlets there are disposed boxes 25 having tops, inner walls and ends. These boxes serve to prevent ingress to the pockets 23 as the pockets are brought into and out of registration with the outlets 16 and 17. On the sides of the hopper there are mounted brackets 26 on which are mounted spring actuated rods 27 that are pivotally connected to the boxes. These rods slidably extend downwardly and outwardly through the brackets 26 and urge the boxes into engagement with the top surface of the uppermost plate and into engagement with the walls of the hopper. On the brackets 26 there are mounted leaf springs 28 which project inwardly through the outlets 16 and 17 respectively and are adapted to enter the pockets 23 to dislodge fertilizer from the pockets as they pass by the outlet.

The plates 20 and 21 are preferably, but not necessarily dome-shaped in form so that they slope from their foundation outwardly toward their edges. These plates rest upon a shoulder on the shaft 14 and the shaft is preferably equipped with a thrust bearing 29 supported on a central spider 30 in the housing.

The operation and advantages of the improved fertilizer distributor are as follows: The fertilizer that is to be distributed is dumped into the hopper 15. As the vehicle or tractor on which the distributor is mounted, traverses the ground, shaft 11 is rotated which brings about the rotation of shaft 14. The fertilizer in the hopper is effectively steered and forced downwardly by the impeller 24 and fills the pockets 23. During the rotation of the plates 21 and 20. During the rotation of these plates by the shaft the pockets are consecutively carried into and out of registration with the outlets, passing beneath the boxes 25 which prevent further ingress of fertilizer from the hopper into the pockets while the pockets are emptying through the outlets. Each pocket 23 will, of course, contain a predetermined quantity of fertilizer. This quantity, however, may be varied by adding or subtracting plates 21. By adding plates 21 the height of the pockets 23 will be increased and consequently the volumetric capacity of each pocket will be increased. In this manner with a given setting of the machine the fertilizer will be constantly and evenly fed and distributed from the hopper and into the spouts 18 and 19 and deposited upon or between the rows. Any tendency of the fertilizer to remain in the pockets 23 is eliminated by the leaf springs 28 which enter the pockets and dislodge the fertilizer therefrom after the pockets are brought into registration with the outlets.

By means of the above described construction, even though the fertilizer may be hygroscopic and caky or lumpy in condition, an even feeding or distribution of the fertilizer can be easily accomplished. The impeller 24 tends to break up the lumps and the edges of the recesses 22 tend to break down cakes or lumps by attrition during the rotation of the plates within the hopper so that the fertilizer delivered through the spouts 18 and 19 is not only delivered at a uniform rate but in a finely comminuted and readily distributable condition.

Various changes may be made in the details of construction without departing from the spirit or scope of the invention as defined by the appended claims.

I claim:

1. A fertilizer distributor comprising a hopper having outlets in the bottom of the sides thereof, a bottom for the hopper, means for rotating the bottom relatively to the hopper, said bottom presenting peripheral recesses cooperating with the sides of the hopper to form pockets adapted to be filled with fertilizer from within the hopper and which are consecutively brought into registration with the hopper, and spring actuated means urged into engagement with the walls of the hopper and the bottom for covering the pockets after they pass into and out of registration with the outlets.

2. A fertilizer distributor comprising a hopper having outlets in the bottoms of the sides thereof, a vertical central shaft in the bottom of the hopper, one or more superposed blades on the shaft forming a bottom for the hopper, means for rotating the shaft, there being peripheral recesses in the blades cooperating with the sides of the hopper to form pockets adapted to receive fertilizer from the hopper and conduct it to the outlets as the shaft rotates, means closing the tops of the pockets against ingress thereto as the pockets are brought into and out of registration with the outlets, and an impeller on the shaft above said plates rotatable by the shaft.

3. A fertilizer distributor comprising a hopper having outlets in the bottoms of the sides thereof, a vertical central shaft in the bottom of the hopper, one or more superposed blades on the shaft forming a bottom for the hopper, means for rotating the shaft, there being peripheral recesses in the blades cooperating with the sides of the hopper to form pockets adapted to receive fertilizer from the hopper and conduct it to the outlets as the shaft rotates, means closing the tops of the pockets against ingress thereto as the pockets are brought into and out of registration with the outlets, and yieldable means extending into the pockets when they are brought into registration with the outlets for dislodging fertilizer therefrom into the outlets.

4. A fertilizer distributor comprising a hopper having outlets in the bottoms of the sides thereof, a vertical central shaft in the bottom of the hopper, one or more superposed blades on the shaft forming a bottom for the hopper, means for rotating the shaft, there being peripheral recesses in the blades cooperating with the sides of the hopper to form pockets adapted to receive fertilizer from the hopper and conduct it to the outlets as the shaft rotates, means closing the tops of the pockets against ingress thereto as the pockets are brought into and out of registration with the outlets, and leaf springs extending into the outlets adapted to enter the pockets as they pass into registration with the outlets for dislodging fertilizer therefrom.

HERMANN E. GRETHER.